United States Patent
Lapin et al.

[11] Patent Number: 5,891,930
[45] Date of Patent: Apr. 6, 1999

[54] HIGH TEMPERATURE COATING COMPOSITION FOR GLASS OPTICAL FIBERS, A METHOD OF MAKING A COATING COMPOSITION AND A COATED OPTICAL GLASS FIBER

[75] Inventors: Stephen C. Lapin; Edward J. Murphy, both of Elgin, Ill.

[73] Assignee: DSM N.V., Heerlen, Netherlands

[21] Appl. No.: 694,781

[22] Filed: Aug. 9, 1996

Related U.S. Application Data

[60] Provisional application No. 60/002,408 Aug. 17, 1995.
[51] Int. Cl.$^6$ ..................................... C08F 2/50
[52] U.S. Cl. ............................ 522/31; 522/129; 522/146; 522/170; 528/25; 528/26
[58] Field of Search ..................................... 522/129, 146, 522/170, 31; 528/25, 26

[56] References Cited

U.S. PATENT DOCUMENTS 5,204,433  4/1993  Wewers et al. .
5,381,504  1/1995  Novack et al. .

FOREIGN PATENT DOCUMENTS 0391162  10/1996  European Pat. Off. .
0735118  10/1996  European Pat. Off. .
95/27010  10/1995  WIPO .

Primary Examiner—Marion E. McCamish
Assistant Examiner—J. M. Gray
Attorney, Agent, or Firm—Pillsbury Madison & Sutro

[57] ABSTRACT

Provided is a radiation-curable optical glass fiber coating composition adapted to provide the combination of properties of:

(i) enhanced resistance to thermal degradation when suitably cured; and (ii) a viscosity sufficient to provide a surface substantially free-of pitting.

The composition is formulated from components including:

(A) at least one epoxy silicone monomer or oligomer which is crosslinkable via actinic radiation, or mixture thereof;

(B) at least one thermoplastic resin which is substantially unreactive to actinic radiation and which is soluble or dispersible in component (A), said thermoplastic resin being present in an amount to provide said composition with a viscosity suitable for application to an optical glass fiber; and (C) a catalytically effective amount of a photoinitiator for catalyzing the crosslinking reaction of component (A) and which is soluble or dispersible in component (A) or a mixture of said component (A) and said thermoplastic resin. Also provided is a method of making the radiation-curable coating composition and a coated optical glass fiber.

22 Claims, 3 Drawing Sheets

HIGH TEMPERATURE COATING COMPOSITION FOR GLASS OPTICAL FIBERS, A METHOD OF MAKING A COATING COMPOSITION AND A COATED OPTICAL GLASS FIBER

This application claims priority to provisional application Ser. No. 60/002,408 filed on Aug. 17, 1995. The complete disclosure of the provisional application is incorporated herein by reference.

FIELD OF THE INVENTION

This invention relates to a high temperature coating composition for a glass optical fiber and to a glass optical fiber coated with the cured composition. More particularly, this invention provides a UV-curable coating composition containing an epoxy silicone monomer or oligomer, a non-reactive thermoplastic polymer, and a photoinitiator, which does not require a solvent.

BACKGROUND OF RELATED ART

In the construction of glass optical fibers, a coating or coating layers are usually applied to the glass optical fibers immediately after drawing to protect the glass surface from the detrimental effects of chemical and/or mechanical attack which would otherwise occur. These coating layers are generally formed from organic UV curable oligomers, reactive diluents, photoinitiators, stabilizers, and a silane coupling agent.

Typically, UV coatings used in telecommunications are based on acrylated urethane oligomers. Coatings made from acrylated urethane oligomers can withstand a maximum continuous temperature of about 125° C.

Other applications, such as medical, aerospace, and industrial applications require a higher temperature resistance, such as up to 200° C. of continuous service.

Coatings based on polyimide are currently used for many high temperature applications, examples of which are disclosed in "Characterization of Polyimide Coated Optical Fibers", Optical Engineering, Jun. 1991, Vol. 30, No. 6, P. 772. However, polyimide coatings have the following disadvantages. The liquid coating composition only has a very limited shelf life, the curing must be conducted thermally which is very slow, and there is a solvent emission during curing.

Optical glass fiber coatings containing epoxy silicones are known. However, their use in high temperature environments has not been reported.

Examples of glass optical fiber coating compositions based on epoxy silicones are disclosed in Canadian Patent No. 1256821, and U.S. Pat. Nos. 4,977,198, 4,990,546, 5,057,358, 5,075,154, 5,187,251, 5,204,433, 5,260,349 and 5,381,504.

In addition to the epoxy silicone monomers, these conventional coating compositions typically contain a reactive polymer having epoxy or vinyl functional groups which can crosslink via actinic radiation. In particular, U.S. Pat. No. 5,240,971 discloses the addition of a linear polyether block having vinyl ether functional groups at both ends which polymerize with the polyorganosiloxane to produce epoxysilicone-polyether linear block copolymers. The addition of the polyether block makes the composition more miscible with polar molecules, and the coatings produced therefrom are more flexible and elastic than coatings derived from UV-cured, linear epoxy-silicones without polyether blocks (column 10, lines 46–59).

U.S. Pat. No. 5,340,989 discloses at column 3, lines 60–65 that the coating composition can further contain adherence modulators which are linear resins bearing vinyl, epoxy, vinyl ether, alcohol and the like functional groups. This patent teaches that the adherence modulator prevents adhesion of metal sheets, glass, plastics or paper to other materials they would otherwise adhere to. See column 4, lines 5–12.

A disadvantage of the above conventional coating compositions based on epoxy silicones is that specific oligomers must be synthesized to provide appropriate liquid properties, curing properties, and cured coating properties.

Furthermore, conventional coating compositions containing epoxy silicone monomers have many problems with long term stability of the composition and a viscosity which is too low. A low viscosity makes it very difficult to coat a glass optical fiber. Moreover, these conventional coating compositions exhibit problems with surface defects, such as pitting, when applied to glass optical fibers.

There is a need for a high temperature coating composition which avoids these problems.

SUMMARY OF THE INVENTION

An objective of the present invention is to provide a coating composition for glass optical fibers which has a fast cure rate, is solventless, and which has a stable viscosity in a range which is suitable for applying the coating composition to a glass optical fiber.

Another objective of the present invention is to provide a coating composition for glass optical fibers which when cured is resistant to high temperatures, free of surface defects such as pitting, protects the glass optical fiber from moisture and mechanical attack, and which exhibits sufficient adhesion to the glass optical fiber while being strippable from the glass optical fiber.

The above objectives and other objectives are obtained by the following.

The invention provides a radiation-curable optical glass fiber coating composition adapted to provide the combination of properties of:
  (i) enhanced resistance to thermal degradation when suitably cured; and
  (ii) a viscosity sufficient to provide a surface substantially free-of pitting;
the composition being formulated from components comprising:
  (A) at least one epoxy silicone monomer or oligomer which is crosslinkable via actinic radiation, or mixture thereof;
  (B) at least one thermoplastic resin which is substantially unreactive to actinic radiation and which is soluble or dispersible in component (A), said thermoplastic resin being present in an amount to provide said composition with viscosity which is suitable for applying the coating composition to an optical glass fiber; and
  (C) a catalytically effective amount of a photoinitiator for catalyzing the crosslinking reaction of component (A) and which is soluble or dispersible in component (A) or a mixture of said component (A) and said thermoplastic resin.

The invention also provides a radiation-curable optical glass fiber coating composition adapted to provide the combination of properties of:
  (i) enhanced resistance to thermal degradation when suitably cured; and (ii) a viscosity sufficient to provide a surface substantially free-of pitting;

the composition being formulated from components comprising:

(A) about 40 to about 99.5% by weight of at least one epoxy silicone monomer or oligomer which is crosslinkable via actinic radiation, or mixture thereof;

(B) about 5 to about 50% by weight of at least one thermoplastic resin which is substantially unreactive to actinic radiation and which is soluble or dispersible in component (A); and (C) a catalytically effective amount of a photoinitiator for catalyzing the crosslinking reaction of component (A) and which is soluble or dispersible in component (A) or a mixture of said component (A) and said thermoplastic resin.

The invention further provides methods of making the optical glass fiber coating compositions and optical glass fibers coated with the cured optical glass fiber coating compositions.

DETAILED DESCRIPTION OF THE PREFERRED EMBODIMENTS

Figure 1:
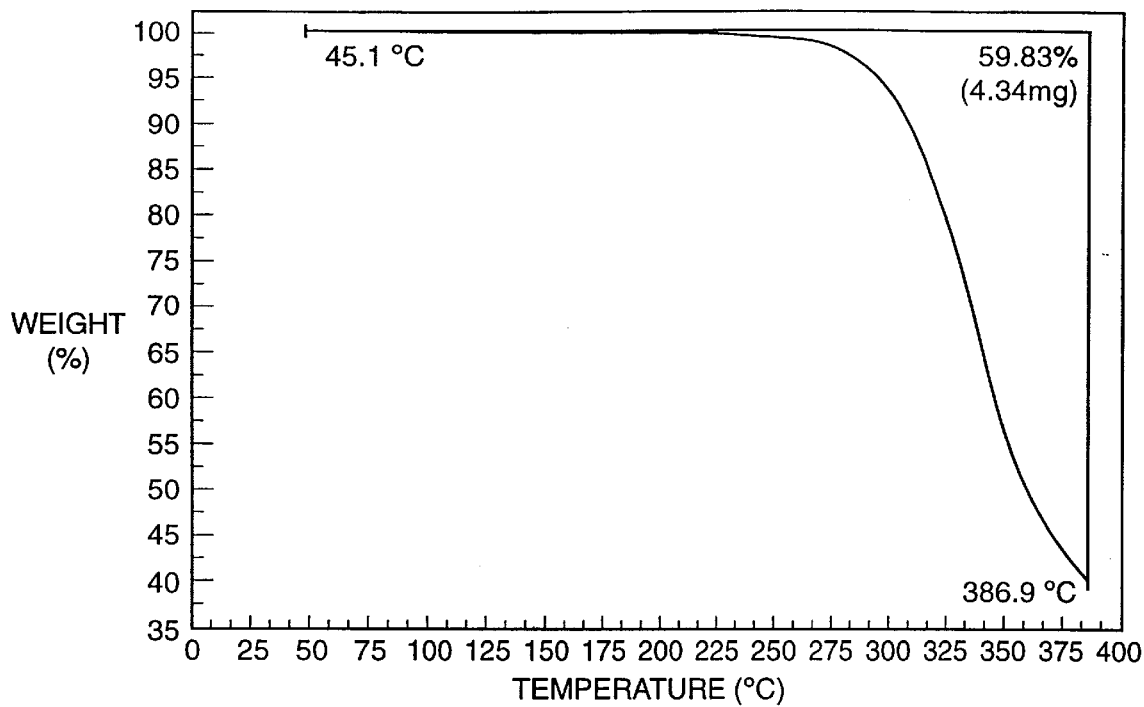
FIG. 1 illustrates a thermogram of Example 1.

Any epoxy silicone monomer or oligomer, or mixture thereof, can be used which contains an epoxide functional group that is cationically crosslinkable when exposed to actinic radiation, such as UV light. Examples of suitable epoxy silicone monomers include those described in "UV Cure of Epoxy-Silicone Monomers", J. V. Crivello, et. al., ACS Symposium Series 417, chapter 28, pp. 398–411, which is incorporated herein by reference.

Further examples of epoxy silicone monomers and oligomers that can be used are those described U.S. Pat. Nos. 4,977,198, 4,990,546, 5,057,358, 5,075,154, 5,187,251, 5,204,433, and 5,260,349, which are incorporated herein by reference.

Preferably, the epoxy silicone monomer or oligomer is a di-functional epoxy silicone monomer such as:

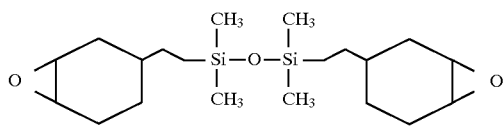

The thermoplastic non-reactive polymer can be composed of one organic polymer or a mixture of more than one organic polymers. The language "non-reactive" means a polymer which is substantially non-polymerizable by itself via actinic radiation and which contains substantially no free acrylate or other polymerizable functional groups such as epoxides and ethylenic unsaturation.

Examples of suitable non-reactive thermoplastic polymers include, but are not limited to, homopolymers or copolymers of alkyl(meth)acrylate monomers. The language "(meth)acrylate" as used herein, includes acrylate, methacrylate, or mixtures thereof. A particularly suitable non-reactive thermoplastic polymer is the copolymer of methylmethacrylate and butylmethacrylate.

The non-reactive polymer should be included in an amount to provide a viscosity of the coating composition which is suitable for applying the coating composition to a glass optical fiber. Examples of such viscosities ranging from about 1,000 to about 10,000 mPas (25° C.), more preferably about 2,000 to about 8,000 mPas (25° C.). For the purposes herein, the non-reactive thermoplastic polymer is typically present in the coating composition in an amount of about 5 to about 50 weight %, preferably about 10 to about 40 weight %.

The selection of the type of the non-reactive polymer will depend on the dispersibility or solubility of the non-reactive polymer in the epoxy silicone monomer or oligomer selected. The thermoplastic non-reactive polymer should be dispersible or soluble in the epoxy silicone monomer or oligomer. The non-reactive polymer can be in a solid or liquid form when added to the epoxy silicone monomer or oligomer and then dissolve or disperse in the epoxy silicone monomer or oligomer. Preferably, the non-reactive polymer dissolves in the epoxy silicone monomer or oligomer.

The photoinitiator used can be any catalyst which catalyzes the crosslinking reaction of the epoxy silicone monomer or oligomer when the coating composition is exposed to actinic radiation. Examples of suitable photoinitiators include onium salt initiators. Examples of suitable onium salts are those disclosed in U.S. Pat. No. 5,340,898, which is incorporated herein by reference.

Preferably, the onium salts for use herein are diaryliodonium salts. Examples of suitable diaryliodonium salts are disclosed in U.S. Pat. No. 4,882,201, which is incorporated herein by reference. The onium salt (4-octyloxiyphenyl)-phenyliodonium-hexafluoroantimonate is very suitable for use herein.

The amount of catalyst present is not critical, so long as an effective amount is employed to achieve proper crosslinking of the epoxy silicone monomer or oligomer within a desired cure time. Typical cure times are, for example, from about 0.2 to about 5 seconds, more preferably less than one second, at a UV light dose in the range of about 0.2 to about 2 joules/cm$^2$. For the purposes of this invention, catalyst amounts of from about 0.1% to about 10% by weight, preferably about 0.5% to about 5% by weight, have been found suitable. Preferably, the photoinitiator is dispersible or dissolvable in the epoxy silicone monomer or oligomer, or in the mixture of the epoxy silicone monomer or oligomer and the thermoplastic resin.

The coating composition can also include conventional additives such as adhesion promoters, antioxidants, inhibitors, pigments, modifying silicone containing or non-silicone containing polyols, photosensitizers, solvents, stabilizers, and other ingredients typically used in glass optical fiber coating compositions for the purpose of contributing their expected function. While a solvent can be added if desired, preferably, the coating composition does not contain any solvents.

Preferably, the coating composition also contains a stabilizer to prevent gelling during storage. The stabilizer should not interfere with the cationic initiated actinic radiation cure. The stabilizer can be used, for example, in amounts up to about 3% by weight. Preferably, the stabilizer is phenothiazine.

The coating compositions described herein can be prepared by merely mixing the ingredients together. The coating compositions can be applied to glass optical fibers using any conventional means and then cured by exposing the coating to actinic radiation, for example UV light.

The cured coatings have the required resiliency to be used on glass optical fibers and they protect the glass optical fibers from chemical, moisture and mechanical attack. The cured coatings are also resistant to elevated temperatures and aggressive environments. For example, the coated fibers can be used in medical, aerospace and industrial applications which require high heat resistance, such as remote sensors for oil well drilling. It has been found that while the non-reactive thermoplastic polymer itself has very poor heat resistance, the combination of the non-reactive thermoplastic polymer and the epoxy silicone monomers and oligomers provide cured coatings having excellent elevated temperature resistance. In particular, the cured coatings described herein can be used in continuous service at temperatures up to about 200° C., and for short periods of time at temperatures up to about 300° C., without substantially degrading the coating.

The invention will be further explained by the following non-limiting examples.

EXAMPLES

Four coating compositions were made by combining the ingredients shown in Table 1. A 75 μm film of each coating composition was drawn on a glass plate and cured at 2.0 joule/cm$^2$ using a Fusion D lamp in nitrogen. The tensile strength, elongation, modulus and glass transition temperature were measured. The results are also shown in Table 1.

These test results demonstrate that the addition of the non-reactive polymer to the epoxysilicone monomer solves the problems of surface pitting when the epoxysiloxane monomer is coated on a glass optical fiber. A cured coating made from only the epoxysilicone monomer had significant amounts of surface pitting, which prevents use of the epoxysilicone monomer on glass optical fibers. When 15% of the non-reactive polymer was added to the epoxysilicone monomer, the coating composition was easily applied without surface pitting. Thus, the presence of the non-reactive polymer allows use of the epoxysilicone monomer to coat glass optical fibers.

These test results also demonstrate that the addition of 15% by weight of a non-reactive polymer to the epoxysilicone monomer increases the viscosity of the coating composition to an acceptable level. Before addition of the non-reactive polymer, the viscosity of the epoxysilicone monomer was only 45 mPas, which is difficult for applying the coating composition on a glass optical fiber. After adding only 15% by weight of the non-reactive polymer to the epoxysilicone monomer the viscosity was 1850 mPas, which is acceptable for applying the coating composition on a glass optical fiber.

The test results also show that the tensile strength, elongation and modulus of a cured coating are not substantially degraded by the addition of the non-reactive polymer. In fact, the tensile strength of the coating made by curing the non-reactive polymer and epoxysilicone monomer composition was surprisingly 38 MPa, whereas the tensile strength of the coating made by curing the epoxysilicone monomer was only 22 MPa. Furthermore, the modulus of the coating made by curing the non-reactive polymer and epoxysilicone monomer composition was surprisingly 1650 MPa, whereas

TABLE 1

| Formula Type | Example 1 | Comparative Example A | Comparative Example B | Comparative Example C |
|---|---|---|---|---|
| Reactive Resin | epoxy silicone monomer[6] | SARTOMER SR2000[2] | Urethane Acrylate[4] | epoxy silicone monomer[6] |
| Reactive Resin: % wt | 84 | 81 | 97 | 99 |
| Thermoplastic Resin | ACRYLOID B66[1] (Rohm and Haas) | Acryloid B66[1] (Rohm and Haas) | | |
| Thermoplastic Resin: % wt | 15 | 15 | 0 | 0 |
| Photoinit. | onium salt[3] | IRGACURE 184 (Ciba Geigy) | LUCERIN TPO (BASF) | onium salt[3] |
| Photoinit. % wt | 1 | 4 | 3 | 1 |
| Viscosity: mPas | 1850 | 420 | 6000 | 45 |
| % Conversion[5] | 92 | 83 | 95 | 99 |
| Tensile Strength: MPa | 38 | 14 | 26 | 22 |
| Elongation: % | 5 | 19 | 24 | 2 |
| Modulus: MPa @ 0.5% | 1650 | 380 | 640 | 1454 |
| Tg (DMA Tan Delta Max, °C.) | 69/116 | 42 | 55 | 152 |
| Appearance of Coating | No Surface Defects | No Surface Defects | No Surface Defects | Pitting |

[1]Thermoplastic methyl/butyl methacrylate copolymer.
[2]Diacrylate ester of $C_{14}$–$C_{15}$ average chain length.
[3](4-octyloxyphenyl)phenyliodoniumhexafluoroantimonate.
[4]Desolite (Desotech Inc.), which is a commercially available optical glass fiber coating composition.
[5]Determined by extraction with methylethylketone.
[6]The addition product of vinylcyclohexeneoxide and dihydrotetramethyldisiloxane the modulus of the coating made by curing the epoxysilicone monomer was only 1454 MPa.

Figure 2:
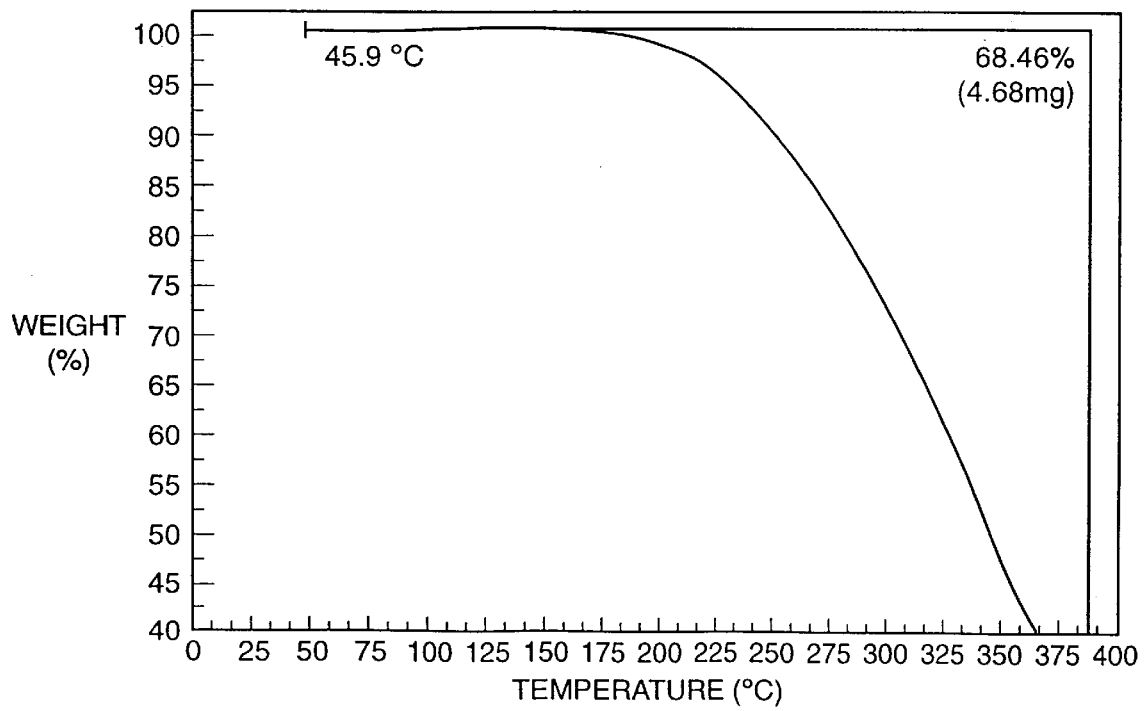
FIG. 2 illustrates a thermogram of Comparative Example A.
Figure 3:
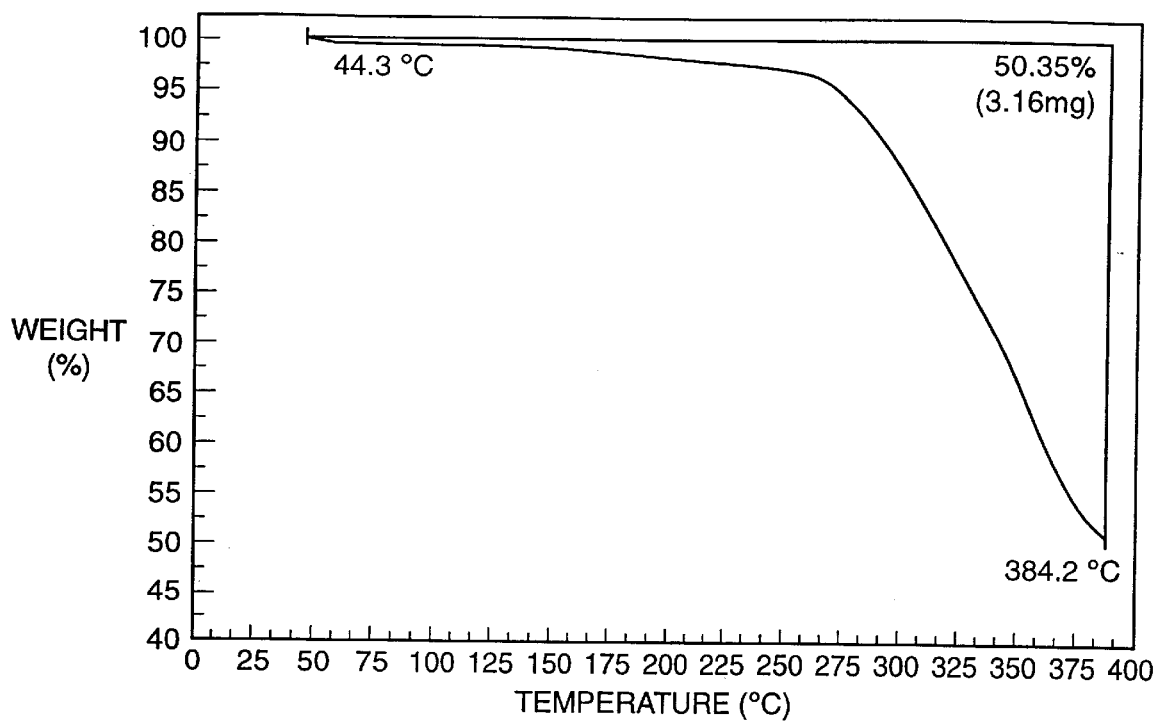
FIG. 3 illustrates a thermogram of Comparative Example B.
Figure 4:
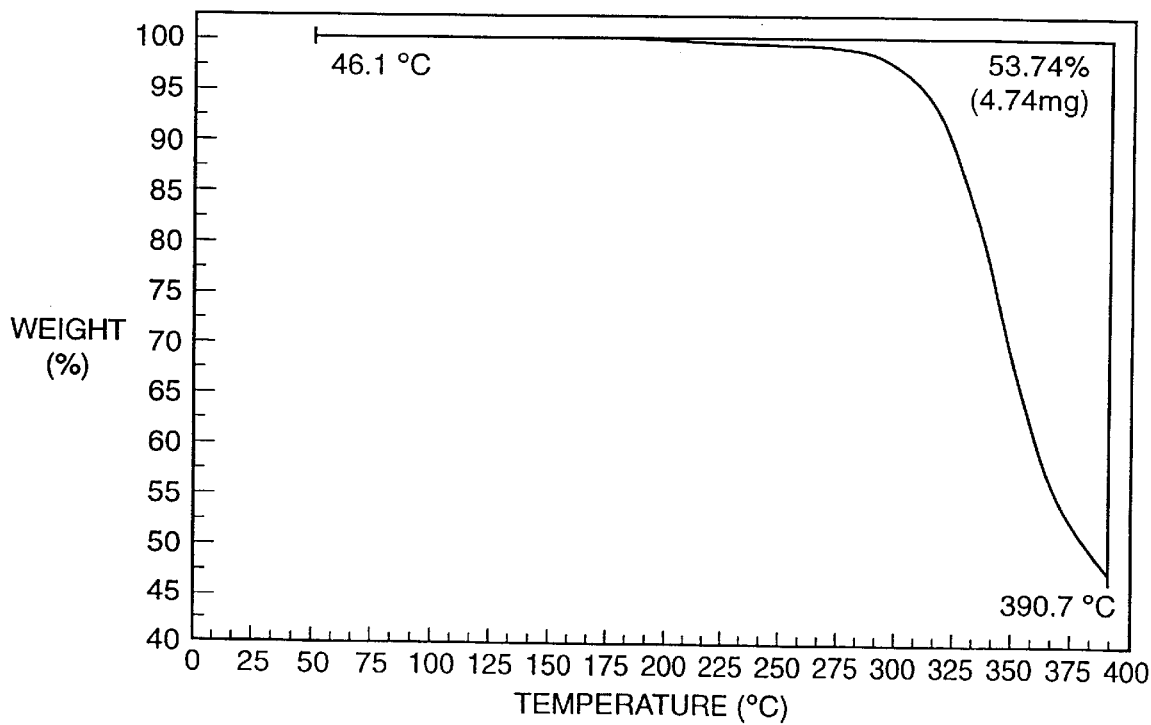
FIG. 4 illustrates a thermogram of Comparative Example C.
Figure 5:
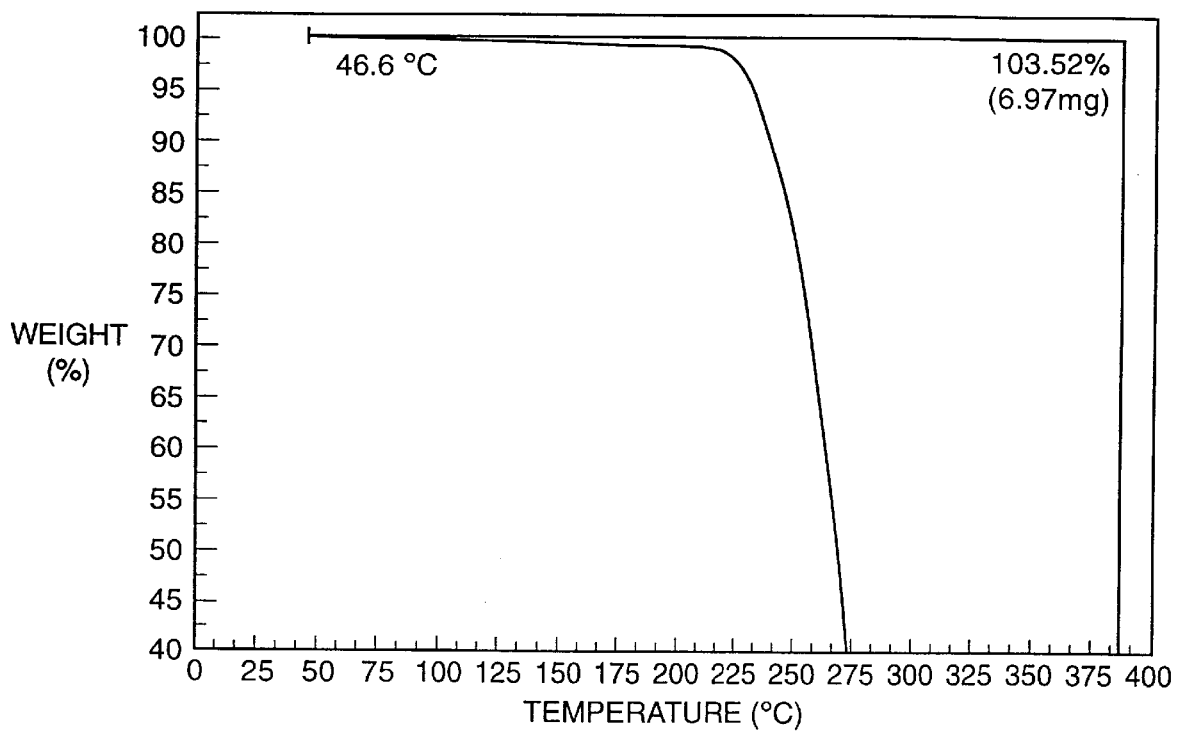
FIG. 5 illustrates a thermogram of Comparative Example D.

An extractables test using methylethylketone (hereinafter "MEK") was conducted on cured films made from Example 1 and Comparative Examples A and B. The results are shown in Table 1. A thermogram test was conducted on cured films made from Example 1, Comparative Examples A–C, and 100% ACRYLOID B-66 (Comparative Example D). The results are shown in Table 2 and FIGS. 1–5.

TABLE 2

|  | Example 1 | Comp. Example A | Comp. Example B | Comp. Example C | Comp. Example D |
| --- | --- | --- | --- | --- | --- |
| Weight Loss 40 min. at 200° C. | 1.71% | 6.68% | 2.57% | | |
| Weight Loss 40 min. at 225° C. | 2.18% | 21.70% | 7.09% | | |
| Temp. at 10% Loss | 317° C. | 245° C. | 288° C. | 321° C. | 238° |

It was expected that because the non-reactive polymer does not crosslink with the epoxysilicone monomer by any known mechanism, the non-reactive polymer would easily be extractable from the cured coating. However, the results of the MEK extractables test demonstrate that the non-reactive polymer is surprisingly not extractable from the cured coating. It is believed that the epoxysilicone monomer is mechanically bound in the matrix of epoxysilicone monomer or might be crosslinked through a heretofore unknown crosslinking mechanism.

The results of the thermogram tests demonstrate that the presence of a non-reactive thermoplastic polymer surprisingly does not substantially degrade the high temperature resistance of coatings made of epoxysilicone monomers. A coating made from only the epoxysilicone monomer lost 10% of the mass at a temperature of 321° C. A coating made from only the non-reactive polymer lost 10% of the mass at a temperature of 238° C. It was expected that by adding 15% by weight of the non-reactive polymer to the epoxysilicone monomer, the resulting coating would lose 10% of the mass at a temperature much lower than 321° C. However, it was found that the coating made from 15% by weight of non-reactive polymer and the epoxysilicone monomer lost 10% of mass at a temperature of 317° C., which is much higher than expected.

The storage stability of the coating composition of Example 1 was tested. The coating composition of Example 1, without a stabilizer, gelled within 48 hours when stored at 55° C. Several stabilizers were then tested for improving the storage stability of the coating compositions, as shown in Table 3 below.

TABLE 3

|  | Days Stable at 55° C. | |
| --- | --- | --- |
| Stabilizer | 0.02% | 0.50% |
| Hindered Amine (TINUVIN 123) | <3 | <3 |
| Butylated Hydroxytoluene | <3 | <3 |
| Phenothiazine | <3 | >18 |
| Nitrosobenzene | <3 | <3 |

This was an accelerated aging test run at 55° C. Actual stability at room temperature is significantly longer. The results demonstrate that phenothiazine is an effective stabilizer.

Test Procedures:

Viscosity:

The viscosity was measured using a Physica MC10 Viscometer. The test samples were examined and if an excessive amount of bubbles was present, steps were taken to remove most of the bubbles. Not all bubbles need to be removed at this stage, because the act of sample loading introduces some bubbles.

The instrument was set up for the conventional Z3 system, which was used. The samples were loaded into a disposable aluminum cup by using the syringe to measure out 17 cc. The sample in the cup was examined and if it contains an excessive amount of bubbles, they were removed by a direct means such as centrifugation, or enough time was allowed to elapse to let the bubbles escape from the bulk of the liquid. Bubbles at the top surface of the liquid are acceptable.

The bob was gently lowered into the liquid in the measuring cup, and the cup and bob were installed in the instrument. The sample temperature was allowed to equilibrate with the temperature of the circulating liquid by waiting five minutes. Then, the rotational speed was set to a desired value which will produce the desired shear rate. The desired value of the shear rate is easily determined by one of ordinary skill in the art from an expected viscosity range of the sample.

The instrument panel read out a viscosity value, and if the viscosity value varied only slightly (less than 2% relative variation) for 15 seconds, the measurement was complete. If not, it is possible that the temperature had not yet reached an equilibrium value, or that the material was changing due to shearing. If the latter case, further testing at different shear rates will be needed to define the samples viscous properties.

The results reported in Table 1 are the average viscosity values of three test samples.

Extractables:

The % conversion and the MEK extractables were measured as follows. Test samples were prepared by casting a film of the material, having a thickness of 0.003 inch, on a glass plate. The sample film was cured using a UV processor. A one inch square specimen was cut from the samples. The specimen was conditioned by exposure to 130° F. for 1 hour. The square was then weighed to the nearest 0.1 mg and placed in a closed jar with 2 oz. of technical grade MEK for 48 hours at 55° C. Mild and intermittent agitation was applied. The specimen was removed from the MEK, carefully blotted dry, and again conditioned for 1 hour at 130° F. and reweighed to the nearest 0.1 mg. The difference in weight before and after solvent exposure represents the amount of uncured extractable material, and the ratio of the weight after and before then represents the degree of conversion.

DMA tan:

The DMA tan was measured using a Rheometrics Solids Analyzer (RSA-11), equipped with: 1) A personal computer having MS-DOS 5.0 operating system and having Rhios® software (Version 4.2.2 or later) loaded; 2) A liquid nitrogen controller system for low-temperature operation.

The test samples were prepared by casting a film of the material, having a thickness in the range of 0.02 mm to 0.4 mm, on a glass plate. The sample film was cured using a UV processor. A specimen approximately 35 mm (1.4 inches) long and approximately 12 mm wide was cut from a defect-free region of the cured film. For soft films, which tend to have sticky surfaces, a cotton-tipped applicator was used to coat the cut specimen with talc powder.

The film thickness of the specimen was measured at five or more locations along the length. The average film thickness was calculated to ±0.001 mm. The thickness was not allowed to vary by more than 0.01 mm over this length. Another specimen was taken if this condition was not met. The width of the specimen was measured at two or more locations and the average value calculated to ±0.1 mm.

The geometry of the sample was entered into the instrument. The length field was set at a value of 23.2 mm and the measured values of width and thickness of the sample specimen were entered into the appropriate fields.

Before conducting the temperature sweep, moisture was removed from the test samples by subjecting the test samples to a temperature of 800° C. in a nitrogen atmosphere for 5 minutes. The temperature sweep used included cooling the test samples to about −60° C. or about −80° C. and increasing the temperature at about 1°/minute until the temperature reached about 60° C. to about 70° C. The test frequency used was 1.0 radian/second.

Tensile Strength, Elongation, and Modulus:

The tensile strength, elongation, and modulus were measured using a universal testing instrument, Instron Model 4201 equipped with a personal computer and software "Series IX Materials Testing System." The load cells used were 2 and 20 pound capacity. The ASTM D638M was followed, with the following modifications:

A drawdown of the material to be tested was made on a glass plate and cured using a UW processor. The cured film was conditioned at 23°±2° C. and 50±5% relative humidity for a minimum of sixteen hours prior to testing.

A minimum of eight test specimens, having a width of 0.5±0.002 inches and a length of 5 inches, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of test specimen after removal from the substrate.

The average film thickness of the test specimens was determined. At least five measurements of film thickness were made in the area to be tested (from top to bottom) and the average value used for calculations. If any of the measured values of film thickness deviated from the average by more than 10% relative, the test specimen was discarded. All specimens came from the same plate. The appropriate load cell was determined by using the following equation:

$$[A \times 145] \times 0.0015 = C$$

Where: A=Product's maximum expected tensile strength (MPa); 145=Conversion Factor from MPa to psi; 0.00015= approximate cross-sectional area (in$^2$) of test specimens; and C=lbs. The 2 pound load cell was used for materials where C=1.8 lbs. The 20 pound load cell was used for materials where 1.8<C<18 lbs. If C>19, a higher capacity load cell was required.

The crosshead speed was set to 1.00 inch/min, and the crosshead action was set to "return at break". The crosshead was adjusted to 2.00 inches jaw separation. The air pressure for the pneumatic grips was turned on and adjusted as follows: set approximately 20 psi(1.5 Kg/cm$^2$) for primary optical fiber coatings and other very soft coatings; set approximately 40 psi(3 Kg/cm$^2$) for optical fiber single coats; and set approximately 60 psi(4.5 Kg/cm$^2$) for secondary optical fiber coatings and other hard coatings. The appropriate Instron computer method was loaded for the coating to be analyzed.

After the Instron test instrument had been allowed to warm-up for fifteen minutes, it was calibrated and balanced following the manufacturer's operating procedures.

The temperature near the Instron Instrument was measured and the humidity was measured at the location of the humidity gage. This was done just before beginning measurement of the first test specimen.

Specimens were only analyzed if the temperature was within the range 23°±1.0° C. and the relative humidity was within 50±5%. The temperature was verified as being within this range for each test specimen. The humidity value was verified only at the beginning and the end of testing a set of specimens from one plate.

Each test specimen was tested by suspending it into the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested. The calculation of tensile properties was performed automatically by the software package.

The values for tensile strength, % elongation, and (secant or segment) modulus were checked to determine whether any one of them deviated from the average enough to be an "outlier." If the modulus value was an outlier, it was discarded. If there were less than six data values for the tensile strength, then the entire data set was discarded and repeated using a new plate.

Thermogram:

The weight loss at elevated temperatures was measured using a DuPont model 9900. Test samples were prepared by casting films of the materials, having a thickness of about 10 mil, on glass plates. The sample films were cured using a UV processor. Small squares of test specimens, in the range of 10 to 20 mg of material, were cut from the sample films.

The instrument was set up and the TGA software package was run. The sample parameters were entered as follows:
Sample weight: 10 to 20 mg.
Atmosphere: Air at 100 cc/min.
Temperature program: Isothermal, 200° C. for 60 minutes.

The TGA module balance was zeroed and tared, following the manufacturer's procedure. The balance assembly was retracted from the furnace, and a test specimen was placed in the balance pen. The balance was then returned to the correct position in the furnace. The sample weight was automatically determined.

An air flow was established to 100 cc/minute (±20 cc/min) through the furnace. The furnace was purged for five minutes to establish equilibrium.

The control and data acquisition software was initiated, and the test to proceeded for 60 minutes. The results were provided by the software package. The accuracy of the weight measurements is ±1.0% of full scale. The precision of the weight measurement is ±0.4% of full scale.

While the invention has been described in detail and with reference to specific embodiments thereof, it will be apparent to one of ordinary skill in the art that various changes and modifications can be made therein without departing from the spirit and scope of the claimed invention.

We claim:

1. A radiation-curable coating composition for an optical glass fiber adapted to provide the combination of properties of;
   (i) enhanced resistance to thermal degradation when suitably cured; and
   (ii) a viscosity sufficient to provide a surface substantially free-of pitting; the composition being formulated from components comprising:
   (A) at least one epoxy silicone monomer or oligomer which is crosslinkable via actinic radiation, or mixture thereof;
   (B) at least one thermoplastic resin which is substantially unreactive to actinic radiation and which is soluble or dispersible in component (A), said thermoplastic resin being present in an amount sufficient to provide said coating composition with a viscosity which is suitable for applying the coating composition to an optical glass fiber, wherein said thermoplastic resin contains substantially no epoxides, ethylenic unsaturation, or free acrylates; and
   (C) a catalytically effective amount of a photoinitiator for catalyzing the crosslinking reaction of component (A) and which is soluble or dispersible in component (A) or a mixture of said component (A) and said thermoplastic resin (B).

2. A radiation-curable optical glass fiber coating composition according to claim 1, wherein said thermoplastic resin is present in an amount to provide said composition with a viscosity of about 1,000 to about 10.000 mPas (25° C.).

3. A radiation-curable optical glass fiber coating composition according to claim 1, wherein said thermoplastic resin is present in an amount to provide said composition with a viscosity of about 2,000 to about 8,000 mPas (25° C.).

4. A radiation-curable optical glass fiber coating composition according to claim 1, wherein said composition is substantially solvent-free.

5. A radiation-curable optical glass fiber coating composition according to claim 1, wherein said photoinitiator is an onium salt.

6. A radiation-curable optical glass fiber coating composition according to claim 1, further comprising a stabilizer in an amount up to about 3% by weight.

7. A radiation-curable optical glass fiber coating composition according to claim 6, wherein said stabilizer is phenothiazine.

8. A radiation-curable optical glass fiber coating composition according to claim 1, wherein said epoxy silicone monomer or oligomer is a di-functional epoxy silicone monomer or oligomer.

9. A radiation-curable optical glass fiber coating composition according to claim 1, wherein said epoxy silicone monomer or oligomer is the addition product of vinylcyclohexeneoxide and dihydrotetramethyldisiloxane.

10. A radiation-curable optical glass fiber coating composition adapted to provide the combination of properties of:
    (i) enhanced resistance to thermal degradation when suitably cured; and
    (ii) a viscosity sufficient to provide a surface substantially free-of pitting; the composition being formulated from components comprising:
    (A) about 40 to about 99.5% by weight of at least one epoxy silicone monomer or oligomer which is crosslinkable via actinic radiation, or mixture thereof;
    (B) about 5 to about 50% by weight of at least one thermoplastic resin which is substantially unreactive to actinic radiation and which is soluble or dispersible in component (A), and
    (C) a catalytically effective amount of a photoinitiator for catalyzing the crosslinking reaction of component (A) and which is soluble or dispersible in component (A) or a mixture of said component (A) and said thermoplastic resins wherein said thermoplastic resin contains substantially no epoxides, ethylenic unsaturations, or free acrylates.

11. A radiation-curable optical glass fiber coating composition according to claim 10, wherein said at least one epoxy-silicone monomer or oligomer is present in an amount of about 60 to about 85% by weight.

12. A radiation-curable optical glass fiber coating composition according to claim 10, wherein said thermoplastic resin is present in an amount of about 10 to about 40% by weight.

13. A radiation-curable optical glass fiber coating composition according to claim 10, wherein said photoinitiator is present in an amount of about 0.1 to about 10% by weight.

14. A radiation-curable optical glass fiber coating composition according to claim 10, wherein said photoinitiator is present in an amount of about 0.5 to about 5% by weight.

15. A radiation-curable optical glass fiber coating composition according to claim 10, wherein said composition is substantially solvent-free.

16. A radiation-curable optical glass fiber coating composition according to claim 10, wherein said photoinitiator is an onium salt.

17. A radiation-curable optical glass fiber coating composition according to claim 10, further comprising a stabilizer in an amount up to about 3% by weight.

18. A radiation-curable optical glass fiber coating composition according to claim 17, wherein said stabilizer is phenothiazine.

19. A radiation-curable optical glass fiber coating composition according to claim 10, wherein said epoxy silicone monomer or oligomer is a di-functional epoxy silicone monomer or oligomer.

20. A radiation-curable optical glass fiber coating composition according to claim 19, wherein said epoxy silicone monomer or oligomer is the addition product of vinylcyclohexeneoxide and dihydrotetramethyldisiloxane.

21. A radiation-curable optical glass fiber coating composition adapted to provide the combination of properties of:
    (i) enhanced resistance to thermal degradation when suitably cured; and
    (ii) a viscosity sufficient to provide a surface substantially free-of pitting; the composition being formulated from components comprising:
    (A) at least one epoxy silicone monomer or oligomer which is crosslinkable via actinic radiation, or mixture thereof;
    (B) at least one thermoplastic resin which is substantially unreactive to actinic radiation and which is soluble or dispersible in component (A), said thermoplastic resin being present in an amount sufficient to provide said coating composition with a viscosity which is suitable for applying the coating composition to an optical glass fiber, wherein said thermoplastic resin is an alkyl(meth)acrylate homopolymer or copolymer; and
    (C) a catalytically effective amount of a photoinitiator for catalyzing the crosslinking reaction of component (A) and which is soluble or dispersible in component (A) or a mixture of said component (A) and said thermoplastic resin (B).

22. A radiation-curable optical glass fiber coating composition adapted to provide the combination of properties of:
   (i) enhanced resistance to thermal degradation when suitably cured; and
   (ii) a viscosity sufficient to provide a surface substantially free-of pitting; the composition being formulated from components comprising:
   (A) about 40 to about 99.5% by weight of at least one epoxy silicone monomer or oligomer which is crosslinkable via actinic radiation, or mixture thereof;
   (B) about 5 to about 50% by weight of at least one thermoplastic resin which is substantially unreactive to actinic radiation and which is soluble or dispersible in component (A), wherein said thermoplastic resin is an alkyl(meth)acrylate homopolymer or copolymer; and
   (C) a catalytically effective amount of a photoinitiator for catalyzing the crosslinking reaction of component (A) and which is soluble or dispersible in component (A) or a mixture of said component (A) and said thermoplastic resin.

* * * * *